United States Patent
Sharma et al.

(10) Patent No.: US 11,157,468 B2
(45) Date of Patent: *Oct. 26, 2021

(54) SYSTEM FOR MULTI-RELEASE AND PARALLEL DEVELOPMENT OF A DATABASE

(71) Applicant: Bank of America Corporation, Charlotte, NC (US)

(72) Inventors: Satyen Raghavendra Sharma, Ahmedabad (IN); Sandeep Verma, Sector 86 Gurgaon (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/669,969

(22) Filed: Oct. 31, 2019

(65) Prior Publication Data
US 2020/0081872 A1 Mar. 12, 2020

Related U.S. Application Data

(63) Continuation of application No. 15/656,554, filed on Jul. 21, 2017, now Pat. No. 10,467,202.

(51) Int. Cl.
*G06F 16/00* (2019.01)
*G06F 16/21* (2019.01)
(Continued)

(52) U.S. Cl.
CPC .............. *G06F 16/212* (2019.01); *G06F 8/35* (2013.01); *G06F 8/60* (2013.01); *G06F 8/71* (2013.01);
(Continued)

(58) Field of Classification Search
CPC ... G06F 16/212; G06F 16/219; G06F 16/2228
See application file for complete search history.

(56) References Cited

U.S. PATENT DOCUMENTS

| 5,634,098 A | 5/1997 | Janniro et al. |
| 5,680,007 A | 10/1997 | Niigaki et al. |

(Continued)

FOREIGN PATENT DOCUMENTS

| CN | 101414160 A | 4/2009 |
| CN | 101719097 A | 6/2010 |

(Continued)

*Primary Examiner* — Khanh B Pham
(74) *Attorney, Agent, or Firm* — Michael A. Springs; Moore & Van Allen PLLC; Anup Shrinivasan Iyer

(57) ABSTRACT

Systems, computer program products, and methods are described herein for multi-release and parallel development of a database. The present invention is configured to determine a first version of a database release, wherein the first version is based on a first script; receive an incremental script associated with the first version of the database release; implement a database modeling tool to generate a second script, thereby creating a second version of the database release based on at least the first script and the incremental script; automatically generate an incremental database package based on at least the second version of the database release; and deploy the incremental database package, wherein deploying further comprises creating a second version of the database release based on the second script, wherein the second script is a baseline script for the second version of the database release.

19 Claims, 11 Drawing Sheets

(51) Int. Cl.
*G06F 8/60* (2018.01)
*G06F 8/71* (2018.01)
*G06F 8/35* (2018.01)
*G06F 16/22* (2019.01)

(52) U.S. Cl.
CPC ........ *G06F 16/219* (2019.01); *G06F 16/2228* (2019.01)

(56) References Cited

U.S. PATENT DOCUMENTS

| | | | |
|---|---|---|---|
| 6,609,133 | B2 * | 8/2003 | Ng ............................ G06F 8/30 |
| 6,816,814 | B2 | 11/2004 | Ebert et al. |
| 7,107,322 | B1 | 9/2006 | Freeny, Jr. |
| 7,809,763 | B2 * | 10/2010 | Nori ...................... G06F 16/213 |
| | | | 707/802 |
| 8,429,618 | B2 | 4/2013 | Hogan |
| 8,655,952 | B1 | 2/2014 | Schilit |
| 9,195,457 | B1 | 11/2015 | Gebhard |
| 2004/0249830 | A1 | 12/2004 | Sonkin et al. |
| 2005/0159828 | A1 | 7/2005 | Deininger et al. |
| 2005/0240409 | A1 | 10/2005 | Gallistel |
| 2007/0283030 | A1 | 12/2007 | Deininger et al. |
| 2009/0300580 | A1 | 12/2009 | Heyhoe et al. |
| 2009/0327324 | A1 * | 12/2009 | Laflen ...................... G06F 16/22 |
| 2010/0036248 | A1 | 2/2010 | Chouno |
| 2011/0208700 | A1 | 8/2011 | Noble |
| 2013/0166508 | A1 | 6/2013 | Eluri et al. |
| 2013/0173541 | A1 | 7/2013 | Iyer et al. |
| 2014/0143782 | A1 | 5/2014 | Shekar et al. |
| 2015/0095796 | A1 | 4/2015 | Kutz et al. |
| 2015/0289009 | A1 | 10/2015 | Bremm et al. |
| 2016/0223704 | A1 | 8/2016 | Donderici et al. |
| 2016/0292143 | A1 | 10/2016 | Rametta |
| 2017/0052776 | A1 | 2/2017 | Kotian |

FOREIGN PATENT DOCUMENTS

| | | |
|---|---|---|
| CN | 101807816 A | 8/2010 |
| EP | 2068214 A1 | 6/2009 |
| WO | 200131486 A2 | 5/2001 |
| WO | 2014145230 A1 | 9/2014 |

* cited by examiner

CREATE DATABASE PACKAGE

METHOD

SOURCE

REVIEW AND SUBMIT

SUMMARY

SELECT METHOD TO CREATE NEW BRANCH

○ MERGE SOURCE CONTROL BRANCH

○ GENERATE FROM A DATABASE

○ SOURCE CONTROL TO DATABASE AND REVERSE ENGINEERING

[ PREVIOUS ]  [ NEXT ]  [ CANCEL ]  [ FINISH ]

CREATE DATABASE PACKAGE

METHOD

SOURCE

REVIEW AND SUBMIT

SUMMARY

TEAM: [TEAM 1]

RELEASE: [SQL XX VERSION 1]

[PREVIOUS] [NEXT] [CANCEL] [FINISH]

CREATE DATABASE PACKAGE

SOURCE AND TARGET
DIFFERENCES
GENERATE SYNC SCRIPTS

SOURCE TYPE: SOURCE TYPE 1
TEAM: TEAM 1
RELEASE: SQL XX VERSION 1

TARGET TYPE: TARGET TYPE 1
HOST NAME:
SERVICE NAME:
SCHEMA NAME:
USERNAME:
PASSWORD:

PREVIOUS  NEXT  CANCEL  FINISH

SYSTEM FOR MULTI-RELEASE AND PARALLEL DEVELOPMENT OF A DATABASE

CROSS-REFERENCE TO RELATED APPLICATION

This application is a continuation of and claims priority from allowed, co-pending U.S. patent application Ser. No. 15/656,554, filed on Jul. 21, 2017 and entitled "SYSTEM FOR MULTI-RELEASE AND PARALLEL DEVELOPMENT OF A DATABASE".

FIELD OF THE INVENTION

The present invention embraces a system for database automation and solution for multi-release and parallel development.

BACKGROUND

The goal of database automation is to establish an optimized end-to-end process, enhance the development to production cycles, lower the risk of release problems, and provide a quicker time to market. Due to the fundamental differences from application code, different development and deployment processes, it can be a challenge to keep the production version of database intact and ensure seamless deployment of all the parallel release changes. As such, a need exists for efficient database automation and parallel release changes.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for multi-release and parallel development of a database is presented. The system comprising at least one non-transitory storage device; at least one processor; and at least one module stored in said storage device and comprising instruction code that is executable by the at least one processor and configured to cause said at least one processor to: receive a first version of a database release; implement a database modeling tool to generate a first script based on the first version of the database release, wherein generating further comprises reverse engineering the first version of the database release; receive a second version of the database release; implement the database modeling tool to generate a second script based on the second version of the database release, wherein generating further comprises reverse engineering the second version of the database release; compare the second script with the first script to determine a match, wherein comparing further comprises comparing one or more objects associated with the first script with one or more objects associated with the second script; determine one or more objects associated with the second script that do not match the one or more objects associated with the first script; automatically generate an incremental script based on at least the one or more objects associated with the second script that do not match the one or more objects associated with the first script; and automatically generate an incremental database package based on at least the incremental script.

In some embodiments, the module is further configured to: determine a first structure associated with the first version of the database based on at least the first script, wherein the first structure is associated with one or more object types; determine a second structure associated with the incremental script, wherein the second structure is associated with one or more object types; determine whether the first structure and the second structure match, wherein determining further comprises comparing the one or more object types associated with the first structure and the one or more object types associated with the second structure; and automatically generate the incremental database package based on at least determining that the first structure matches the second structure.

In some embodiments, the module is further configured to: receive the second version of the database release; implement the database modeling tool to generate the second script based on the second version of the database release, wherein generating further comprises reverse engineering the second version of the database release; compare the second script with the first script to determine a match, wherein comparing further comprises comparing one or more objects associated with the first script with one or more objects associated with the second script; determine one or more objects associated with the second script that do not match the one or more objects associated with the first script; automatically generate the incremental script based on at least the one or more objects associated with the second script that do not match the one or more objects associated with the first script; and automatically generate the incremental database package based on at least the incremental script.

In some embodiments, the module is further configured to: receive the second script; compare the second script with the first script to determine a match, wherein comparing further comprises comparing one or more objects associated with the first script with one or more objects associated with the second script; determine one or more objects associated with the second script that do not match the one or more objects associated with the first script; automatically generate the incremental script based on at least the one or more objects associated with the second script that do not match the one or more objects associated with the first script; and automatically generate the incremental database package based on at least the incremental script.

In some embodiments, the module is further configured to: determine the first version of the database release, wherein the first version is based on the first script, wherein the first script is a baseline script for the first version of the database release; receive the incremental script associated with the first version of the database release; implement the database modeling tool to generate the second script, thereby creating the second version of the database release based on at least the first script and the incremental script; automatically generate the incremental database package based on at least the second version of the database release; and deploy the incremental database package, wherein deploying further comprises creating the second version of the database release based on the second script, wherein the second script is a baseline script for the second version of the database release.

In some embodiments, the module is further configured to: implement a parsing algorithm to the first script; determine a relationship between the one or more objects, wherein the relationship comprises a primary key-foreign key relationship; automatically generate a dependency tree based on at least the relationship; and determine an order of execution associated with the first script based on at least the dependency tree.

In some embodiments, the module is further configured to: place the incremental database package in a temporary memory queue.

In some embodiments, the module is further configured to: receive an execution sequence associated with the deployment of the incremental database package; retrieve the incremental database package from the temporary memory queue; and deploy the incremental database package based on at least the execution sequence.

In another aspect, a computerized method for multi-release and parallel development of a database is presented. The method comprising: receiving, using a computing device processor, a first version of a database release; implementing, using a computing device processor, a database modeling tool to generate a first script based on the first version of the database release, wherein generating further comprises reverse engineering the first version of the database release; receiving, using a computing device processor, a second version of the database release; implementing, using a computing device processor, the database modeling tool to generate a second script based on the second version of the database release, wherein generating further comprises reverse engineering the second version of the database release; comparing, using a computing device processor, the second script with the first script to determine a match, wherein comparing further comprises comparing one or more objects associated with the first script with one or more objects associated with the second script; determining, using a computing device processor, one or more objects associated with the second script that do not match the one or more objects associated with the first script; automatically generating, using a computing device processor, an incremental script based on at least the one or more objects associated with the second script that do not match the one or more objects associated with the first script; and automatically generating, using a computing device processor, an incremental database package based on at least the incremental script.

In yet another aspect, a computer program product for multi-release and parallel development of a database is presented. The computer program product comprising a non-transitory computer-readable medium comprising code causing a first apparatus to: receive a first version of a database release; implement a database modeling tool to generate a first script based on the first version of the database release, wherein generating further comprises reverse engineering the first version of the database release; receive a second version of the database release; implement the database modeling tool to generate a second script based on the second version of the database release, wherein generating further comprises reverse engineering the second version of the database release; compare the second script with the first script to determine a match, wherein comparing further comprises comparing one or more objects associated with the first script with one or more objects associated with the second script; determine one or more objects associated with the second script that do not match the one or more objects associated with the first script; automatically generate an incremental script based on at least the one or more objects associated with the second script that do not match the one or more objects associated with the first script; and automatically generate an incremental database package based on at least the incremental script.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
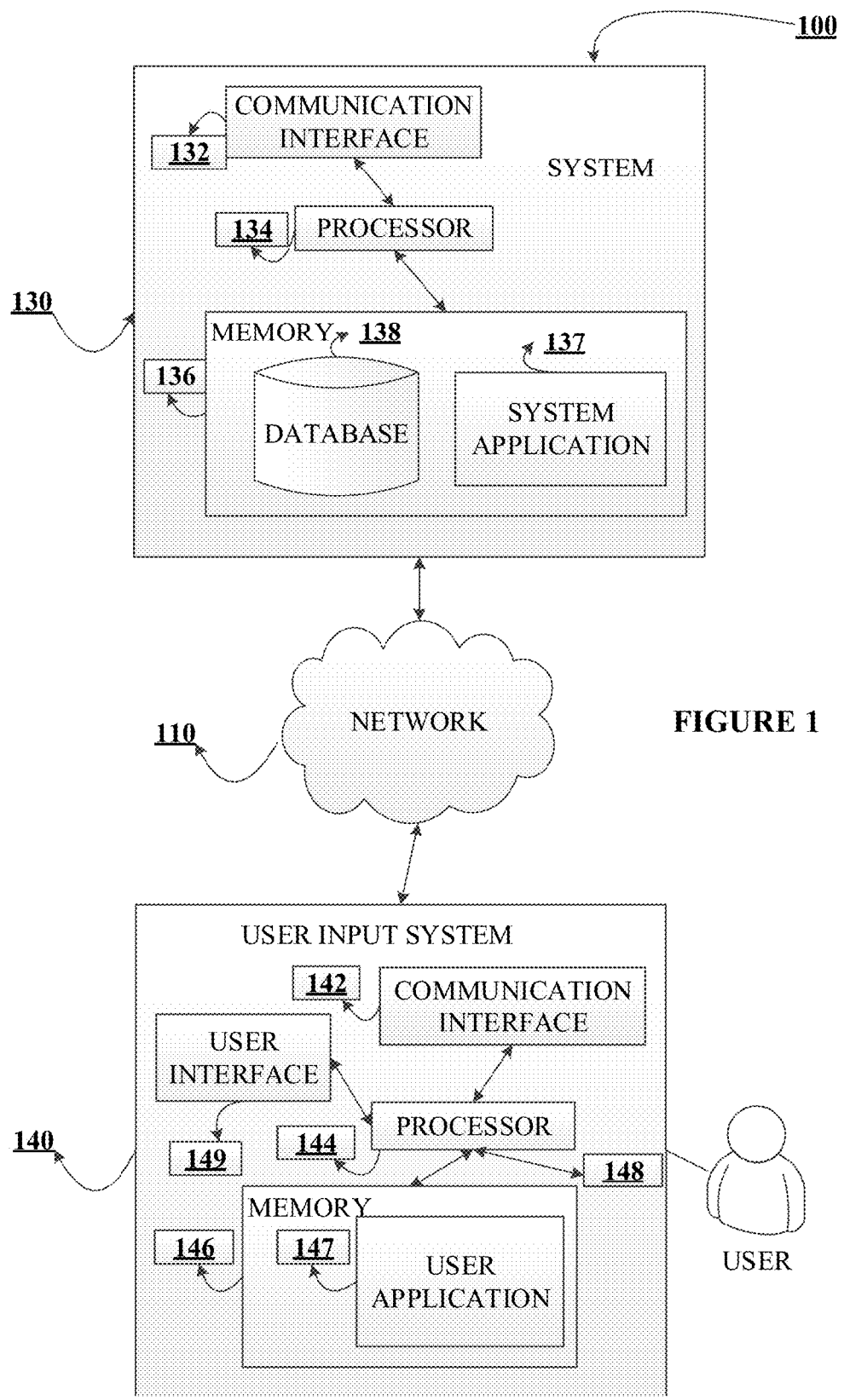
Figure 2:
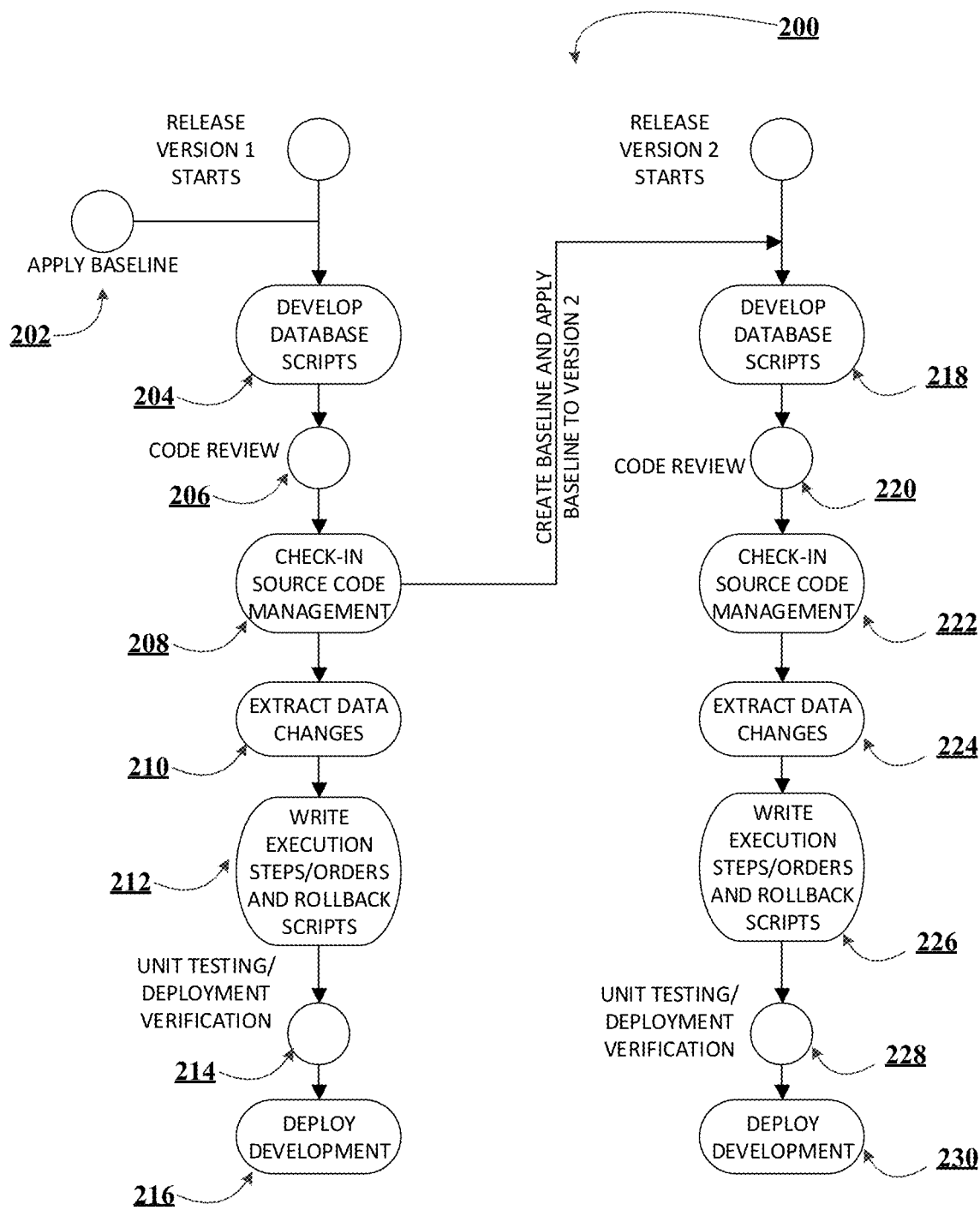
Figure 3:
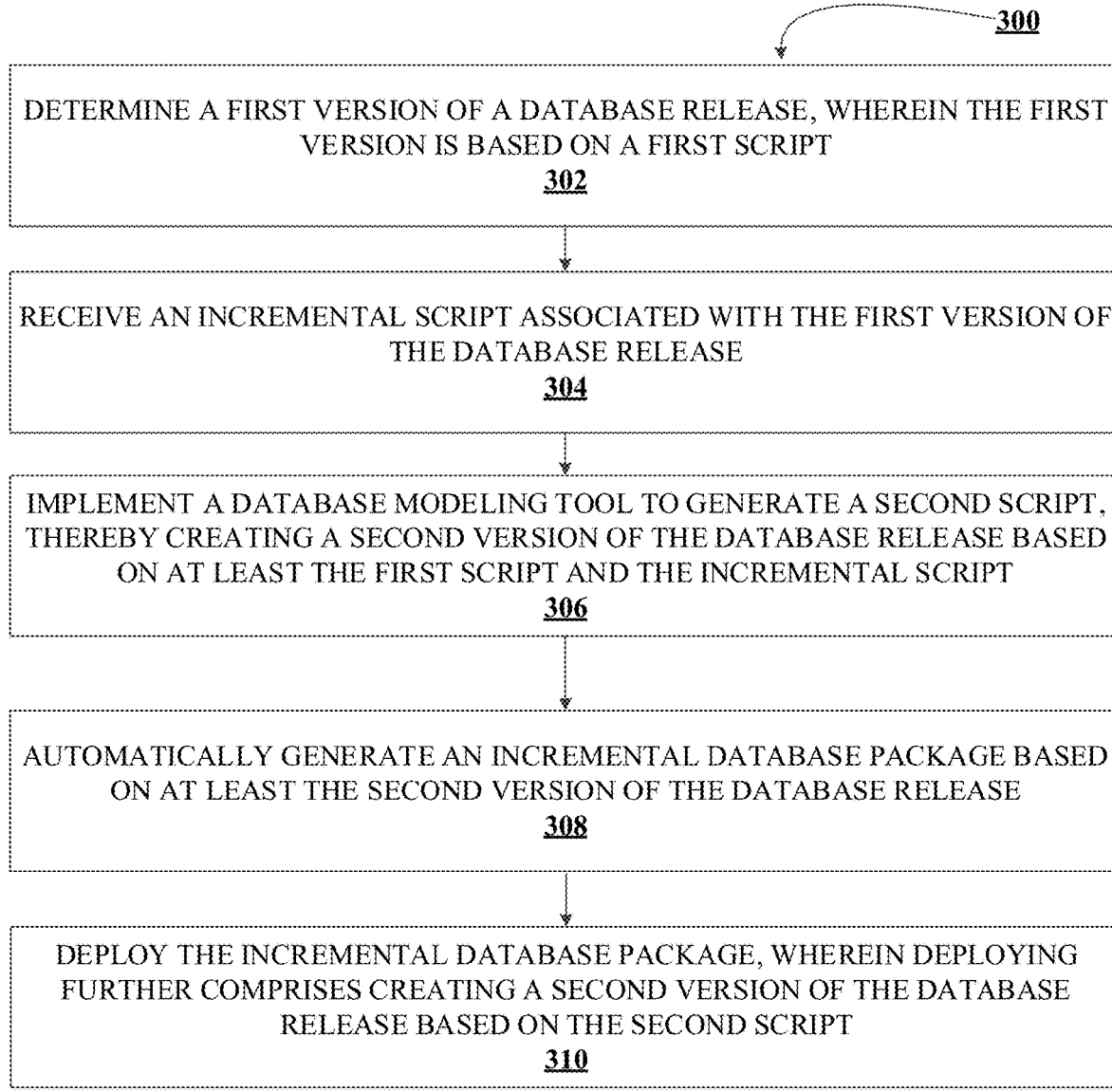
Figure 4:
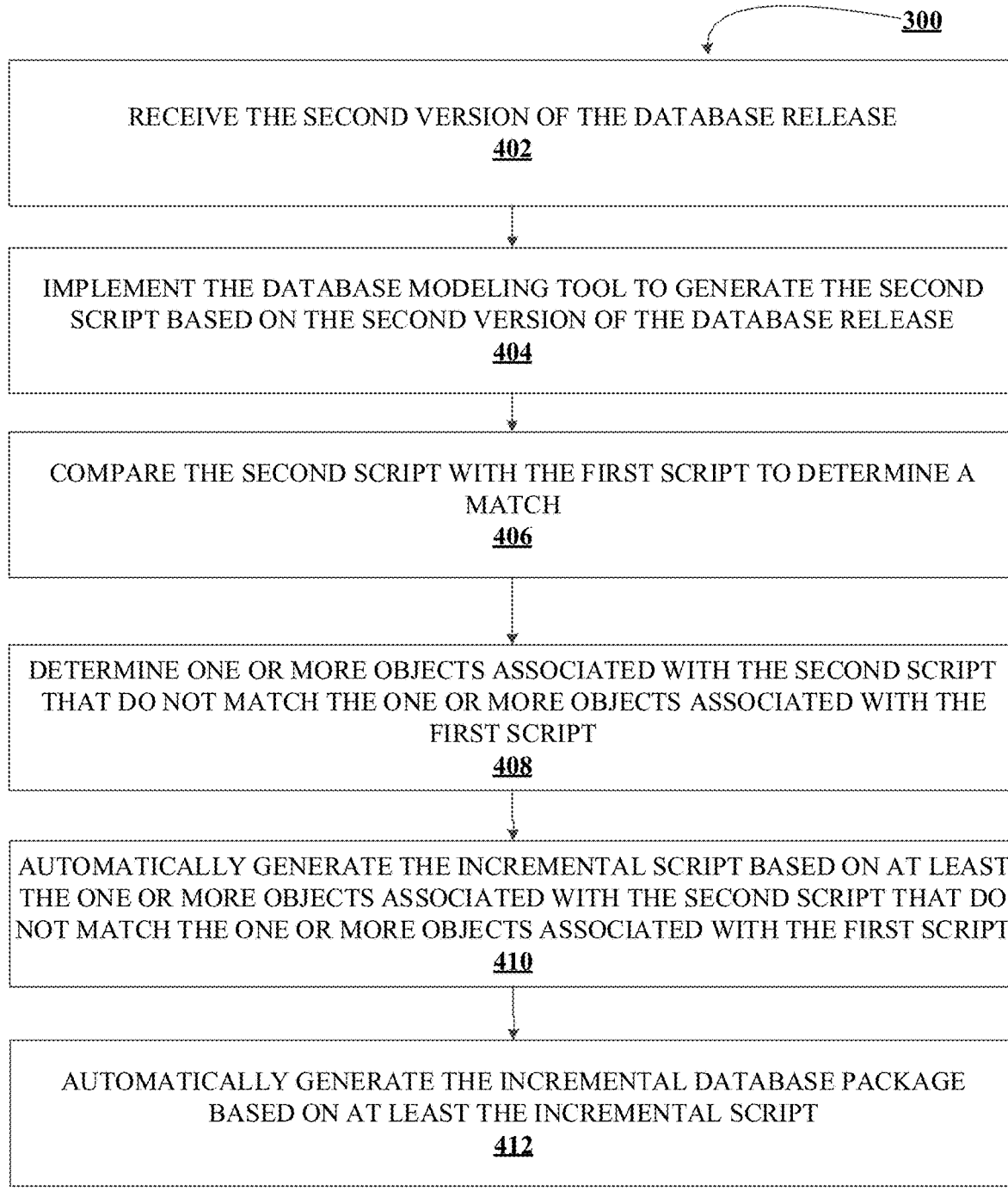
Figure 5:
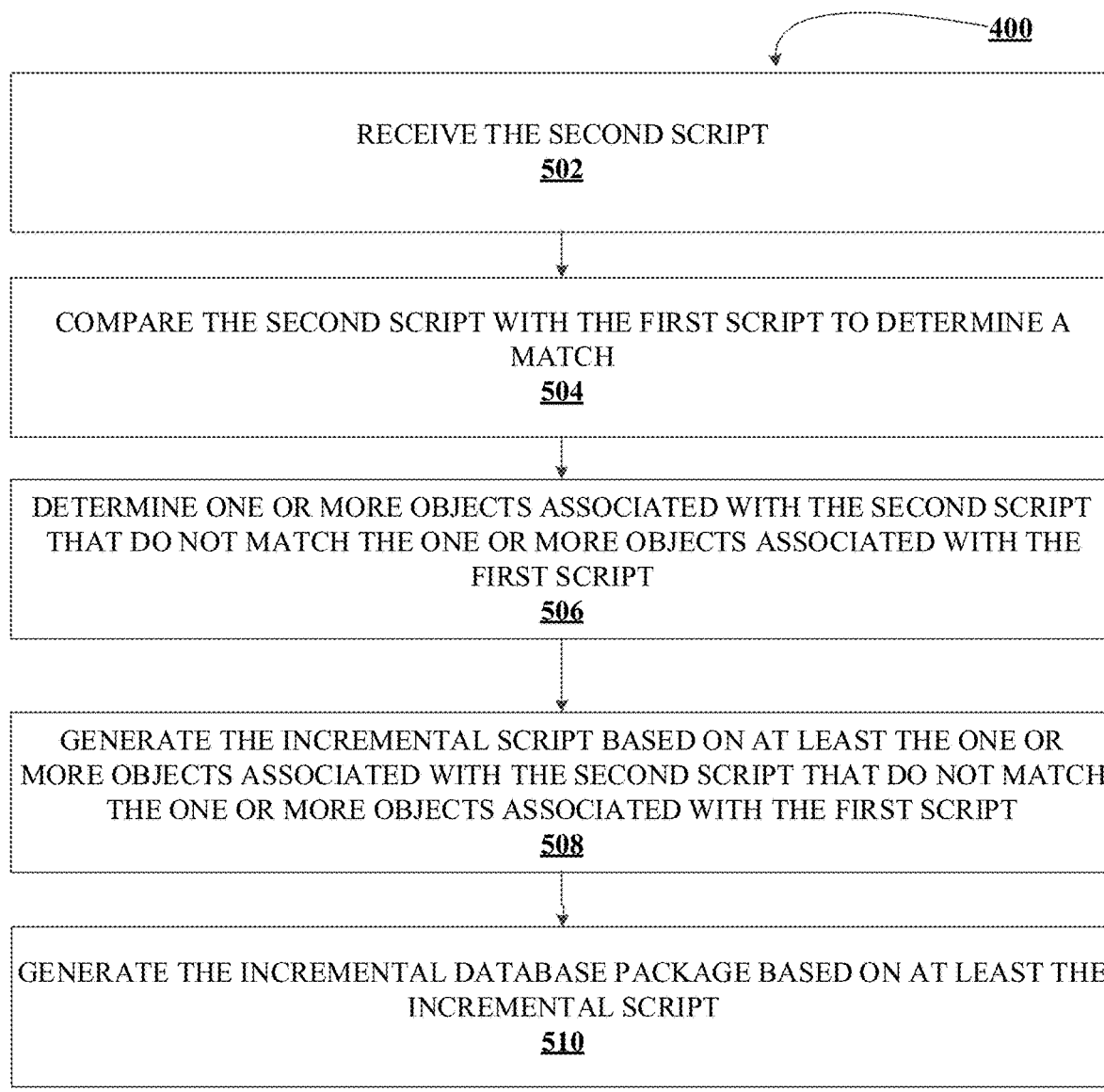
Figure 6:
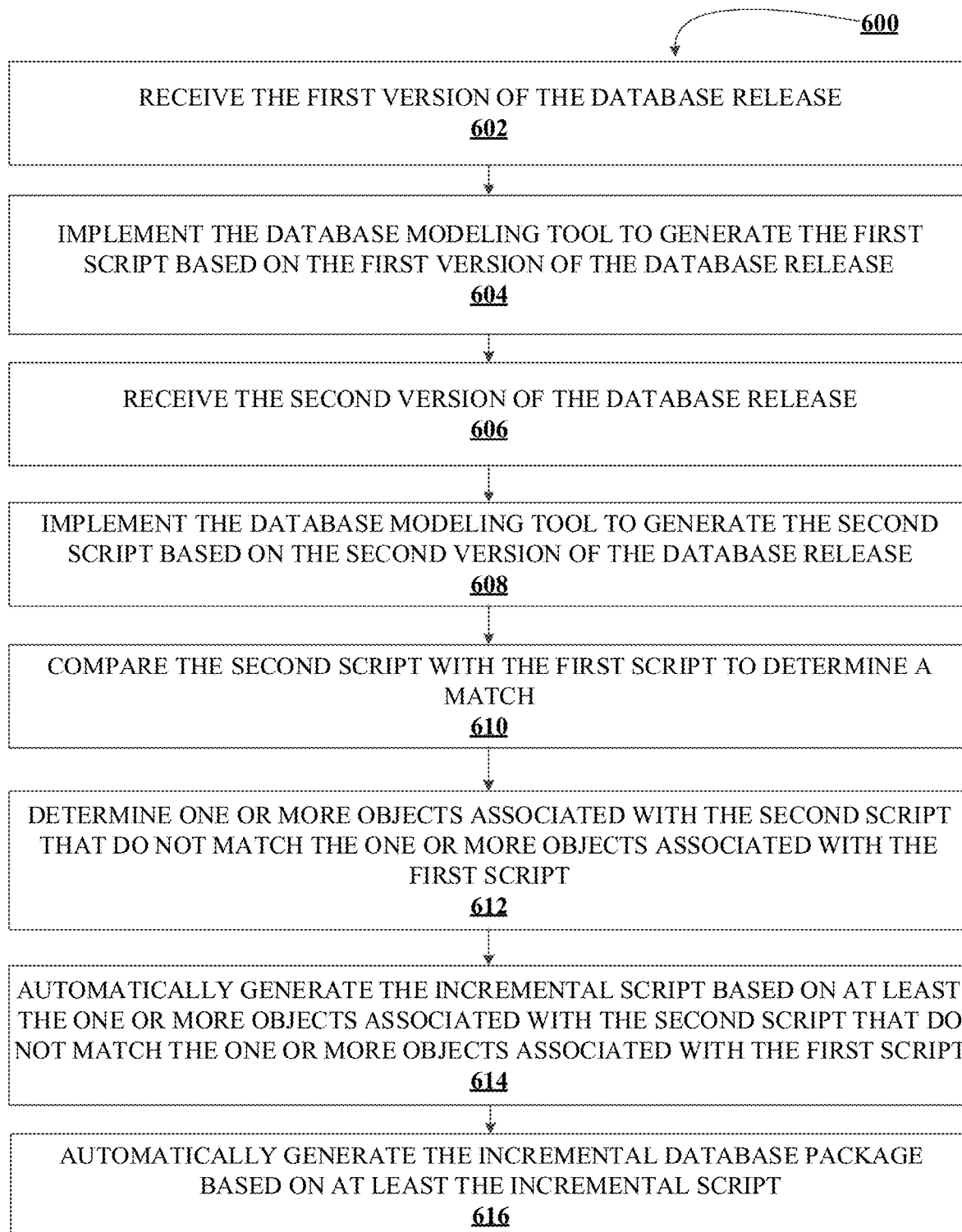
Figure 7:
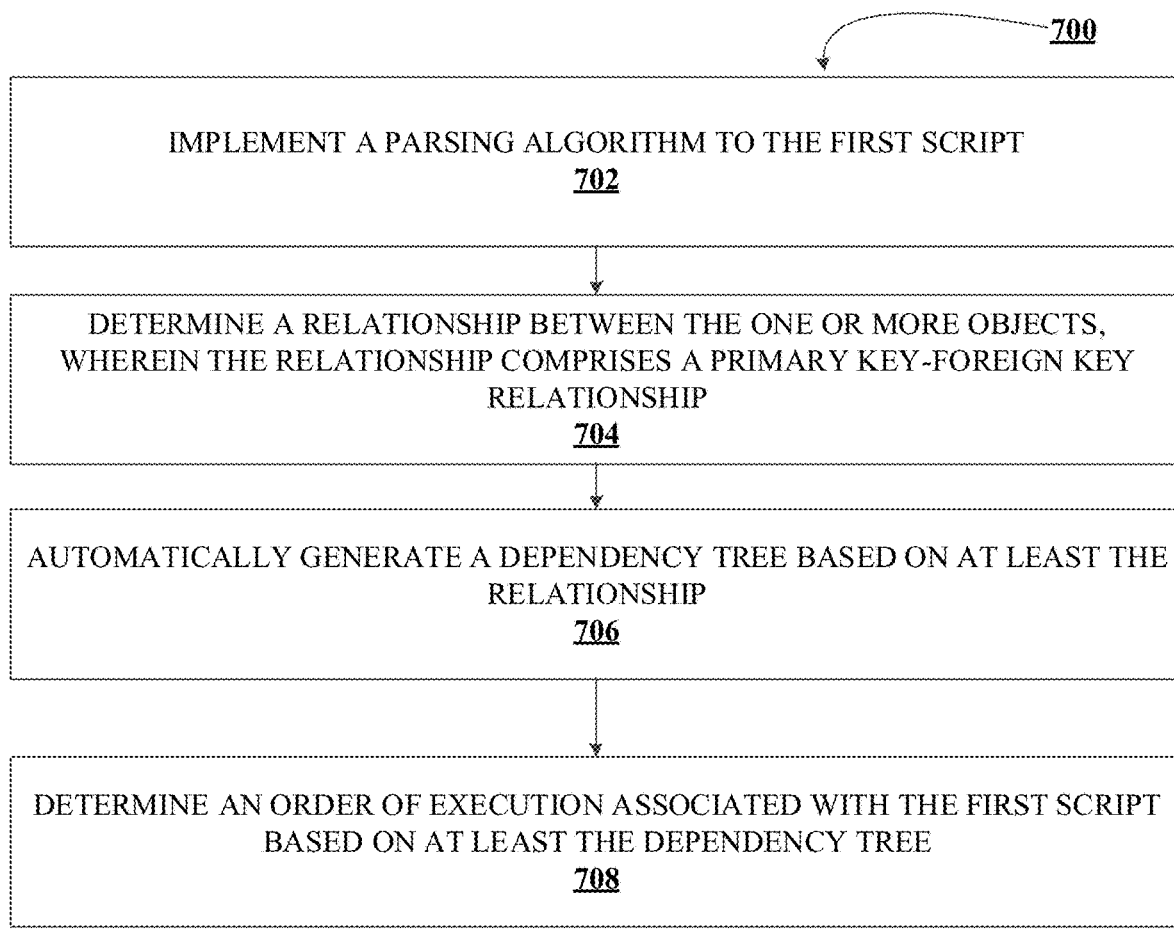
Figure 10:
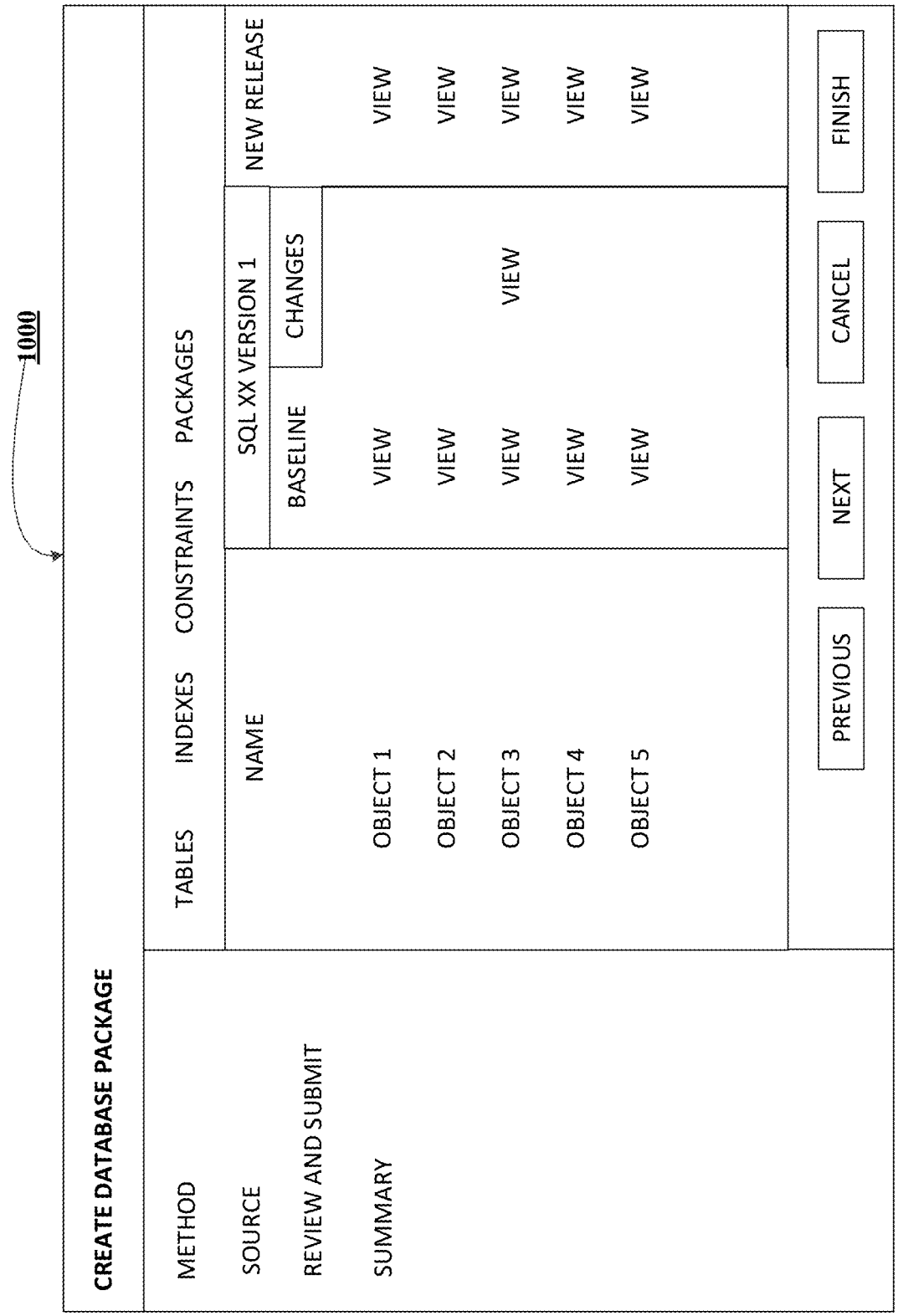

Having thus described embodiments of the invention in general terms, reference will now be made the accompanying drawings, wherein:

FIG. 1 illustrates technical components of a system for transfer of resources via a secure channel using an alias, in accordance with an embodiment of the invention;

FIG. 2 depicts a flowchart illustrating release activities, in accordance with an embodiment of the invention;

FIG. 3 illustrates a process flow for a system for multi-release and parallel development of a database by merging a first script with an incremental script, in accordance with an embodiment of the invention;

FIG. 4 illustrates a process flow for a generating an incremental data package based on a second database, in accordance with an embodiment of the invention;

FIG. 5 illustrates a process flow for a generating an incremental data package based on a second script, in accordance with an embodiment of the invention;

FIG. 6 illustrates a process flow for a generating an incremental data package based on two database releases, in accordance with an embodiment of the invention;

FIG. 7 illustrates a process flow for generating a dependency tree 700, in accordance with an embodiment of the invention; and FIGS. 8-11 illustrate user interfaces for a system for multi-release and parallel development of a database, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

The present invention embraces a system for database automation and solution for multi-release and parallel development. Unlike application development languages like C++, Java and C#.NET etc., where application components get deployed to the target system by either overwriting and/or deleting the existing components and copy the new components, the database deployment is executed in incremental packages or scripts. These incremental (delta) scripts are typically executed on top of existing data and the database structure associated with it. This creates a need for a mechanism to keep the production version of the database intact (base version), and ensure that all parallel release changes (delta or incremental changes) are applied on top of the base version with minimal manual intervention and error.

In the larger enterprise application set up, multiple development teams typically work on database objects and components that are configured to be released in multiple parallel release timelines. Further, scripts are hard to test in their entirely. Most databases may be associated with a primary key-foreign key relationship which defines a one-to-many relationship between two tables in a relational database. A foreign key is a column or a set of columns in one table that references the primary key columns in another table. The primary key is defined as a column (or set of columns) where each value is unique and identifies a single row of the table. This creates a need for a mechanism to define the order of execution because of primary key—foreign key relationship, which enforces a proper order of execution for error free deployment with primary keys executing first and then its corresponding referenced tables.

One way of dealing with the database challenge is to force the database into the generic process: create scripts out of database objects and store them in the traditional version control. However, the scripts in the version control system are not connected to the database objects they represent as these are two separated systems. Coding and testing of the database code is typically done at the database side, disconnected from any of the coding best practices (check-in, check-out, labels etc.), and prone to multiple issues. While scripts are typically taken from the version control before starting the code on the database to prevent working on the wrong version, there is a need for a mechanism to enforce effectively it.

First, the present invention provides a functional benefit of defining rules and structure for development to track and extract the incremental changes. In this regard, the present invention proposes a pre-defined structure for database project to keep different types of objects like tables, indexes, constraints, packages, procedures, functions etc. In one aspect, all enhancements are configured to identify the type of object, name and location in defined structure for modification to help define the execution sequence.

Second, the present invention further provides a functional benefit of tracking the version of database projects running in different environments and on request, extracting the changes after execution of a particular version. To this extent, the present invention configures the system to extract only the new changes to be pulled into deployment package as the current state of database project is already in environment and only new changes need to be extracted and pulled into deployment package. These changes are then configured to be compiled in one executable entity along with execution sequence, and added to the pipeline.

Third, the present invention further provides a functional benefit of parsing the database to define the relationship between different objects. In this regard, the present invention, based on primary key and foreign key relationship, defines the execution order between different objects. In doing so, the present invention builds a tree which begins from root tables (which do not depend on any other object) and then towards leaf tables (where no other table(s) depending on them).

FIG. 1 presents an exemplary block diagram of the system environment 100 for which the distributive network system with specialized data feeds associated with resource distribution. FIG. 1 provides a unique system that includes specialized servers and system communicably linked across a distributive network of nodes required to perform the functions of the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

Developers typically write code in source control, which manages the changes a collection of information including, but not limited to, documents, computer programs, or the like. In some embodiments, any changes made to existing code is stored as a different version of the files that have been modified. In one aspect, the system may be configured to track every file in the source control repository and its version history from the time the files are created/modified to its deployment in a database package. In this regard, each time a database package is generated, the system may be configured to display only the modified file since the last version of the database package was created. In some embodiments, the system may be configured to enable the developer to select from the changed file list and combine in creating a new database package.

FIG. 2 depicts a flowchart illustrating release activities 200, in accordance with an embodiment of the invention. The first version of the release begins by using a baseline script as applied in block 202. This baseline script is used to develop database scripts as shown in block 204. Once developed, the code is then reviewed at 206, and then checked into source code repository 208, so that the changes are made available to other developers. Once the script is checked in, the system may be configured to then extract data changes 210 made to the script by comparing the database script developed with the baseline script. In response to extracting the data changes, the system may then be configured to automatically write execution steps/orders and rollback scripts 212. After the execution steps/orders are tested for deployment verification 214, they are then deployed 216.

As shown in FIG. 2, once the code is checked into the source code repository 208, it creates a new baseline, which is applied to the second version of the release. Similar to the first version of the release, the second version includes receiving database scripts from the developer 218, which is reviewed at 220, and then checked into the source code repository 222, so that the changes are made available to other developers for future releases. Similar to the first version of the release, the second version includes extracting data changes 224, writing execution steps/orders and rollback scripts 226, which is tested for deployment verification 228, and then deployed 230.

FIG. 3 illustrates a process flow for a system for multi-release and parallel development of a database by merging a first script with an incremental script 300, in accordance with an embodiment of the invention. As shown in block 302, the process flow includes determining a first version of a database release, wherein the first version is based on a first script. In some embodiments, the release may not be a database. In this regard, the release may be the deployment of any software product. In one aspect, the first script is used as a baseline script for the first version of the database release.

Next, the process flow includes receiving an incremental script associated with the first version of the database release, as shown in block 304. As discussed herein, database deployment employs an evolutionary database design which involves incremental improvements to the database schema so that it can be continuously updated with changes, reflecting requirements. In response, the process flow includes implementing a database modelling tool to generate a second script, thereby creating a second version of the database release based on at least the first script and the incremental script, as shown in block 306. In some embodiments, creating the second version of the database release includes merging the first script used as the baseline in the deployment of the first version of the release with the incremental script, thereby generating a second script.

Next, the process flow includes automatically generating an incremental database package based on at least the second version of the database release, as shown in block 308. In response to generating the incremental database package, the process flow includes deploying the incremental database package, wherein deploying further comprises creating a second version of the database release based on the second script, as shown in block 310. In this way, the second script is automatically configured to be used as the baseline script for the deployment of the third version of the database release.

In some embodiments, the system may be configured to determine a first structure associated with the first version of the database based on at least the first script. In some embodiments, the first structure is associated with one or more objects. Typically, the one or more object types are used to model real-world entities. An object type includes attributes, which reflects the database's structure, and methods, which implement the operations of the database. A typical use for an object type is to impose structure on some part of the data in the database. In one aspect, the one or more object types includes one or more attributes such as a name, date, location, or the like.

By establishing a pre-defined structure, the system may be configured to manage the database based on the object type and one file per object. In this way, all enhancements to the database must identify the type of object, name, and location in a defined structure for modification. In doing so, the structure helps define the execution sequence. In response to determining the first structure, the system may be configured to determine a second structure associated with the incremental script, wherein the second structure is associated with one or more object types.

FIG. 4 illustrates a process flow for a generating an incremental data package based on a second database 400, in accordance with an embodiment of the invention. As shown in block 402, the process flow includes receiving the second version of the database release. In response, the process flow includes implementing the database modeling tool to generate the second script based on the second version of the database release, as shown in block 404. In some embodiments, the system may be configured to generate the second script by reverse engineering the second version of the database.

As described herein, reverse engineering is the process of creating a data model and/or script from a database. The modeling tool creates a graphical representation of the selected database objects and the relationships between the objects. This graphical representation can be a logical or a physical model. Once reverse engineered, the developer may add new database objects, create system documentation, and/or redesign the database structure. In some embodiments, most of the information that is reverse engineer is explicitly defined in the physical schema. In one aspect, reverse engineering also derives information from the schema and incorporates it into the script and/or data model. For example, if the target database includes one or more primary key-foreign key relationships, the reverse engineering process derives identifying and non-identifying relationships to generate an execution sequence associated with the database release.

In some embodiments, reverse engineering the database includes determining the name, definition, and parameters of each index that is defined on the server are imported. In doing so, the storage location information for each index is maintained, thereby enabling the release of the next version of the database using the same storage assignments. In some other embodiments, reverse engineering the database includes importing the names and definitions of physical storage objects defined on the target server. Once the physical objects are imported, developers can view and modify the object definitions and tables associations.

In response to generating the second script, the process flow includes comparing the second script with the first script to determine a match, as shown in block 406. In some embodiments, the system may be configured to compare one or more objects associated with the first script with the one or more objects associated with the second script. As shown in block 406, the process flow includes determining one or more objects associated with the second script that do not match the one or more objects associated with the first script. In response, the process flow includes automatically generating the incremental script based on at least the one or more objects associated with the second script that do not match the one or more objects associated with the first script, as shown in block 410. In response to generating the incremental script, the process flow includes automatically generating the incremental database package based on at least the incremental script, as shown in block 412.

FIG. 5 illustrates a process flow for a generating an incremental data package based on a second script 500, in accordance with an embodiment of the invention. As shown in block 502, the process flow includes receiving the second script. In response, the process flow includes comparing the second script with the first script to determine a match, as shown in block 504. In some embodiments, the system may be configured to compare one or more objects associated with the first script with one or more objects associated with the second script. In doing so, the system may be configured to determine one or more objects associated with the second script that do not match the one or more objects associated with the first script, as shown in block 506. Next, the process flow includes automatically generating the incremental script based on at least the one or more objects associated with the second script that do not match the one or more objects associated with the first script, as shown in block 508. Once the incremental script is generated, the system may then be configured to automatically generate the incremental database package based on at least the incremental script, as shown in block 510.

FIG. 6 illustrates a process flow for a generating an incremental data package based on two database releases 600, in accordance with an embodiment of the invention. As shown in block 602, the process flow includes receiving the first version of the database release. In response, the system may be configured to implement the database modeling tool to generate the first script based on the first version of the database release, as shown in block 604. In some embodiments, the system may be configured to generate the first script by reverse engineering the first version of the database release. Next, the process flow includes receiving the second version of the database release, as shown in block 606. In response, the system may be configured to implement the database modeling tool to generate the second script based on the second version of the database release, as shown in block 608. In some embodiments, the system may be configured to generate the second script by reverse engineering the second version of the database release. Next, as shown in block 610, the process flow includes comparing the second script with the first script to determine a match. In some embodiments, the system may be configured to compare one or more objects associated with the first script with one or more objects associated with the second script. Next, the process flow includes determining one or more objects associated with the second script that do not match the one or more objects associated with the first script, as shown in block 612. Next, the process flow includes automatically generating the incremental script based on at least the one or more objects associated with the second script that do not match the one or more objects associated with the first script, as shown in block 614. Once the incremental script is generated, the system may then be configured to automatically generate the incremental database package based on at least the incremental script, as shown in block 616.

FIG. 7 illustrates a process flow for generating a dependency tree 700, in accordance with an embodiment of the invention. As shown in block 702, the process flow includes implementing a parsing algorithm to the first script. In this way, the system may be configured to derive identifying and non-identifying relationships from the first script. In response, the system may be configured to determine a relationship between the one or more object, wherein the relationship comprises a primary key-foreign key relationship. As described herein, primary and foreign keys are fundamental characteristics of relational databases. Primary keys and foreign keys are two types of constraints that can be used to enforce data integrity in the database.

Next, the process flow includes automatically generating a dependency tree based at least on the relationship, as shown in block 706. In some embodiments, a dependency tree represents dependencies of one or more objects towards each other based on the primary key-foreign key relationship between the one or more objects. In response to automatically generating the dependency tree, the system may be configured to determine an order of execution associated with the first script based on at least the dependency tree, as shown in block 708.

In some embodiments, in response to generating the incremental data package, the system may be configured to place the incremental database package in a temporary memory queue. In one aspect, the system may be configured to receive an execution sequence associated with the deployment of the incremental data package. In response, the system may be configured to retrieve the incremental data package from the temporary memory queue. Once retrieved, the system may be configured to then deploy the incremental database package based on at least the execution sequence.

FIGS. 8-11 illustrate user interfaces for a system for multi-release and parallel development of a database 800-1100, in accordance with an embodiment of the invention. FIG. 8 illustrates a user interface for selecting at least one method to create a new branch 800. In some embodiments, the user may select the option to create a new branch by merging the source control branch. In this regard, the system may be configured to determine the first script and the incremental script, and merge the scripts to generate the second script to be used as the baseline script for future release. In some other embodiments, the user may select the option to create a new branch by generating it from a database. In this regard, the system may be configured to generate a script from the database by reverse engineering the database. In response, the system may be configured to compare the two reverse engineered scripts to determine the incremental script. In yet another embodiment, the user may select the option to create a new branch by source control to database and reverse engineering. In this regard, the system may be configured to compare the first script and the second script, where the second script is generated by reverse engineering the second version of the database. Once generated, the first script and the second script are compared to generate an incremental script.

Once the user has selected the method of creating a new branch, the user may then be presented with a user interface 900, to enable the user to select a database version the user wishes to work with. Once the source is selected, the user interface 1000 compares the one or more objects to illustrate the objects in the baseline, and the objects that have since been modified or added to a future release. In this way, the user interface offers the user the option to review any object and helps in merging them to generate a new baseline. In some embodiments, the system may be configured to provide multiple options to compare scripts by retrieving them from source code, or reverse engineering them from databases, as shown in 1100.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for multi-release and parallel development of a database, the system comprising:
   at least one non-transitory storage device;
   at least one processor; and
   at least one module stored in said storage device and comprising instruction code that is executable by the at least one processor and configured to cause said at least one processor to:
   receive a first version of a database release;
   implement a database modeling tool to generate a first script based on the first version of the database release, wherein generating further comprises reverse engineering the first version of the database release;
   receive a second version of the database release;
   implement the database modeling tool to generate a second script based on the second version of the database release, wherein generating further comprises reverse engineering the second version of the database release;
   compare the second script with the first script to determine a match, wherein comparing further comprises comparing one or more objects associated with the first script with one or more objects associated with the second script;
   determine one or more objects associated with the second script that do not match the one or more objects associated with the first script;
   automatically generate an incremental script based on at least the one or more objects associated with the second script that do not match the one or more objects associated with the first script;
   automatically generate an incremental database package based on at least the incremental script;
   receive an execution sequence associated with the deployment of the incremental database package;
   retrieve the incremental database package from a temporary memory queue; and
   deploy the incremental database package based on at least the execution sequence.

2. The system of claim 1, wherein the module is further configured to:
   determine a first structure associated with the first version of the database based on at least the first script, wherein the first structure is associated with one or more object types;
   determine a second structure associated with the incremental script, wherein the second structure is associated with one or more object types;
   determine whether the first structure and the second structure match, wherein determining further comprises comparing the one or more object types associated with the first structure and the one or more object types associated with the second structure; and
   automatically generate the incremental database package based on at least determining that the first structure matches the second structure.

3. The system of claim 1, wherein the module is further configured to:
   receive the second version of the database release;
   implement the database modeling tool to generate the second script based on the second version of the database release, wherein generating further comprises reverse engineering the second version of the database release;

compare the second script with the first script to determine a match, wherein comparing further comprises comparing one or more objects associated with the first script with one or more objects associated with the second script;

determine one or more objects associated with the second script that do not match the one or more objects associated with the first script;

automatically generate the incremental script based on at least the one or more objects associated with the second script that do not match the one or more objects associated with the first script; and automatically generate the incremental database package based on at least the incremental script.

4. The system of claim 1, wherein the module is further configured to:

receive the second script;

compare the second script with the first script to determine a match, wherein comparing further comprises comparing one or more objects associated with the first script with one or more objects associated with the second script;

determine one or more objects associated with the second script that do not match the one or more objects associated with the first script;

automatically generate the incremental script based on at least the one or more objects associated with the second script that do not match the one or more objects associated with the first script; and automatically generate the incremental database package based on at least the incremental script.

5. The system of claim 1, wherein the module is further configured to:

determine the first version of the database release, wherein the first version is based on the first script, wherein the first script is a baseline script for the first version of the database release;

receive the incremental script associated with the first version of the database release;

implement the database modeling tool to generate the second script, thereby creating the second version of the database release based on at least the first script and the incremental script;

automatically generate the incremental database package based on at least the second version of the database release; and deploy the incremental database package, wherein deploying further comprises creating the second version of the database release based on the second script, wherein the second script is a baseline script for the second version of the database release.

6. The system of claim 5, wherein the module is further configured to:

implement a parsing algorithm to the first script;

determine a relationship between the one or more objects, wherein the relationship comprises a primary key-foreign key relationship;

automatically generate a dependency tree based on at least the relationship; and determine an order of execution associated with the first script based on at least the dependency tree.

7. The system of claim 1, wherein the module is further configured to:

place the incremental database package in the temporary memory queue.

8. A computerized method for multi-release and parallel development of a database, the method comprising:

receiving, using a computing device processor, a first version of a database release;

implementing, using a computing device processor, a database modeling tool to generate a first script based on the first version of the database release, wherein generating further comprises reverse engineering the first version of the database release;

receiving, using a computing device processor, a second version of the database release;

implementing, using a computing device processor, the database modeling tool to generate a second script based on the second version of the database release, wherein generating further comprises reverse engineering the second version of the database release;

comparing, using a computing device processor, the second script with the first script to determine a match, wherein comparing further comprises comparing one or more objects associated with the first script with one or more objects associated with the second script;

determining, using a computing device processor, one or more objects associated with the second script that do not match the one or more objects associated with the first script;

automatically generating, using a computing device processor, an incremental script based on at least the one or more objects associated with the second script that do not match the one or more objects associated with the first script;

automatically generating, using a computing device processor, an incremental database package based on at least the incremental script;

receiving an execution sequence associated with the deployment of the incremental database package;

retrieving the incremental database package from a temporary memory queue; and deploying the incremental database package based on at least the execution sequence.

9. The computerized method of claim 8, wherein the computerized method further comprises:

determining a first structure associated with the first version of the database based on at least the first script, wherein the first structure is associated with one or more object types;

determining a second structure associated with the incremental script, wherein the second structure is associated with one or more object types;

determining whether the first structure and the second structure match, wherein determining further comprises comparing the one or more object types associated with the first structure and the one or more object types associated with the second structure; and automatically generating the incremental database package based on at least determining that the first structure matches the second structure.

10. The computerized method of claim 8, wherein the computerized method further comprises:

receiving the second version of the database release;

implementing the database modeling tool to generate the second script based on the second version of the database release, wherein generating further comprises reverse engineering the second version of the database release;

comparing the second script with the first script to determine a match, wherein comparing further comprises comparing one or more objects associated with the first script with one or more objects associated with the second script;
determining one or more objects associated with the second script that do not match the one or more objects associated with the first script;
automatically generating the incremental script based on at least the one or more objects associated with the second script that do not match the one or more objects associated with the first script; and
automatically generating the incremental database package based on at least the incremental script.

11. The computerized method of claim 8, wherein the computerized method further comprises:
receiving the second script;
comparing the second script with the first script to determine a match, wherein comparing further comprises comparing one or more objects associated with the first script with one or more objects associated with the second script;
determining one or more objects associated with the second script that do not match the one or more objects associated with the first script;
automatically generating the incremental script based on at least the one or more objects associated with the second script that do not match the one or more objects associated with the first script; and
automatically generating the incremental database package based on at least the incremental script.

12. The computerized method of claim 8, wherein the computerized method further comprises:
determining the first version of the database release, wherein the first version is based on the first script, wherein the first script is a baseline script for the first version of the database release;
receiving the incremental script associated with the first version of the database release;
implementing the database modeling tool to generate the second script, thereby creating the second version of the database release based on at least the first script and the incremental script;
automatically generating the incremental database package based on at least the second version of the database release; and
deploying the incremental database package, wherein deploying further comprises creating the second version of the database release based on the second script, wherein the second script is a baseline script for the second version of the database release.

13. The computerized method of claim 12, wherein the computerized method further comprises:
implementing a parsing algorithm to the first script;
determining a relationship between the one or more objects, wherein the relationship comprises a primary key-foreign key relationship;
automatically generating a dependency tree based on at least the relationship; and
determining an order of execution associated with the first script based on at least the dependency tree.

14. The computerized method of claim 13, wherein the computerized method further comprises:
placing the incremental database package in the temporary memory queue.

15. A computer program product for multi-release and parallel development of a database, the computer program product comprising a non-transitory computer-readable medium comprising code causing a first apparatus to:

receive a first version of a database release;
implement a database modeling tool to generate a first script based on the first version of the database release, wherein generating further comprises reverse engineering the first version of the database release;
receive a second version of the database release;
implement the database modeling tool to generate a second script based on the second version of the database release, wherein generating further comprises reverse engineering the second version of the database release;
compare the second script with the first script to determine a match, wherein comparing further comprises comparing one or more objects associated with the first script with one or more objects associated with the second script;
determine one or more objects associated with the second script that do not match the one or more objects associated with the first script;
automatically generate an incremental script based on at least the one or more objects associated with the second script that do not match the one or more objects associated with the first script;
automatically generate an incremental database package based on at least the incremental script;
receive an execution sequence associated with the deployment of the incremental database package;
retrieve the incremental database package from a temporary memory queue; and
deploy the incremental database package based on at least the execution sequence.

16. The computer program product of claim 15, wherein the first apparatus is further configured to:
determine a first structure associated with the first version of the database based on at least the first script, wherein the first structure is associated with one or more object types;
determine a second structure associated with the incremental script, wherein the second structure is associated with one or more object types;
determine whether the first structure and the second structure match, wherein determining further comprises comparing the one or more object types associated with the first structure and the one or more object types associated with the second structure; and
automatically generate the incremental database package based on at least determining that the first structure matches the second structure.

17. The computer program product of claim 15, wherein the first apparatus is further configured to:
receive the second version of the database release;
implement the database modeling tool to generate the second script based on the second version of the database release, wherein generating further comprises reverse engineering the second version of the database release;
compare the second script with the first script to determine a match, wherein comparing further comprises comparing one or more objects associated with the first script with one or more objects associated with the second script;
determine one or more objects associated with the second script that do not match the one or more objects associated with the first script;
automatically generate the incremental script based on at least the one or more objects associated with the second script that do not match the one or more objects associated with the first script; and automatically generate the incremental database package based on at least the incremental script.

18. The computer program product of claim 15, wherein the first apparatus is further configured to:

receive the second script;

compare the second script with the first script to determine a match, wherein comparing further comprises comparing one or more objects associated with the first script with one or more objects associated with the second script;

determine one or more objects associated with the second script that do not match the one or more objects associated with the first script;

automatically generate the incremental script based on at least the one or more objects associated with the second script that do not match the one or more objects associated with the first script; and automatically generate the incremental database package based on at least the incremental script.

19. The computer program product of claim 15, wherein the first apparatus is further configured to:

determine the first version of the database release, wherein the first version is based on the first script, wherein the first script is a baseline script for the first version of the database release;

receive the incremental script associated with the first version of the database release;

implement the database modeling tool to generate the second script, thereby creating the second version of the database release based on at least the first script and the incremental script;

automatically generate the incremental database package based on at least the second version of the database release; and deploy the incremental database package, wherein deploying further comprises creating the second version of the database release based on the second script, wherein the second script is a baseline script for the second version of the database release.

\* \* \* \* \*